June 25, 1957 M. F. MOORE ET AL 2,796,820
AIR CONDITIONING APPARATUS
Filed March 30, 1954

INVENTOR.
MEADE F. MOORE
WILLIAM CHRISTENSEN

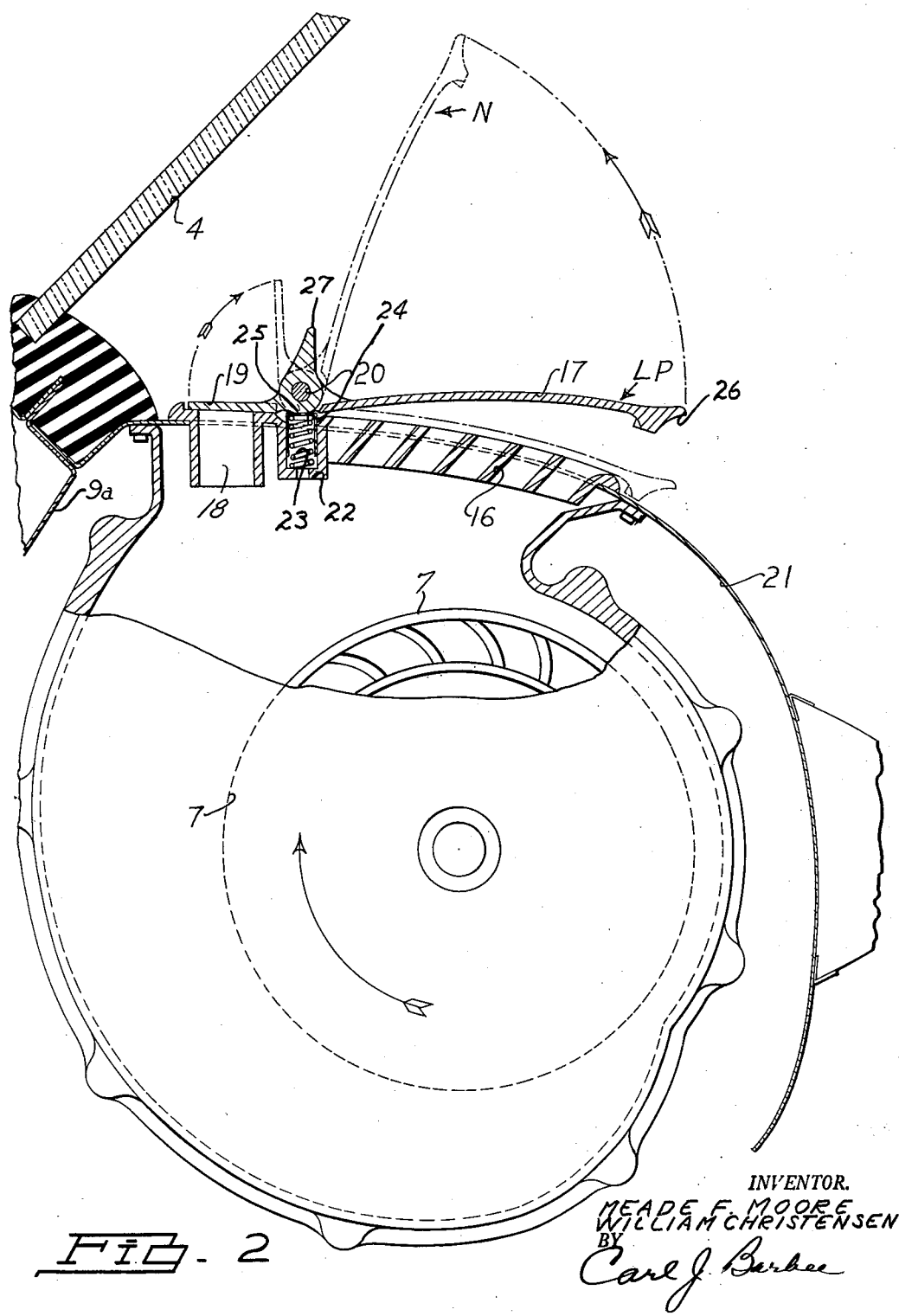

United States Patent Office 2,796,820
Patented June 25, 1957

2,796,820

AIR CONDITIONING APPARATUS

Meade F. Moore, Birmingham, and William Christensen, Detroit, Mich., assignors to American Motors Corporation, a corporation of Maryland Application March 30, 1954, Serial No. 419,689

5 Claims. (Cl. 98—2)

This invention relates to air conditioning means for automobiles and has as a general object to provide an instrument panel having means for directing an air stream in various preselected directions.

The primary object of this invention is to provide an instrument panel for an air conditioned automobile having a large door covering a vaned opening discharging air into the automobile interior and a smaller door covering a vaned opening discharging air up against the windshield. The doors rotate independently about a common hinged pin mounted between the vaned openings.

The peculiar shape and arrangement of the vanes about the discharge openings is to distribute air to satisfactorily defrost a windshield when necessary or to direct cooling air over the lap of an occupant in the front seat of a vehicle and for the cooling quickly of the rear compartment of a vehicle. The design of the discharge grille is such that the entire output of the blower motor is delivered where directed by the vanes. When the large door is in one position and the defrost door is entirely closed, all of the air from the blower motor may be deflected in a manner tangent to the instrument panel. In other words the cooled air is directed toward the occupants of the front seat of the vehicle and the effect is to provide immediate relief to such occupants even though the temperature within the passenger compartment in a locale remote from the front seat would still be well above the desired level. To the occupants of the front seat the impression of a rapid "pull down" of passenger compartment temperature has been effected.

A further object is to provide a generally improved air conditioning system for an automotive vehicle.

A still further object is to provide in an air conditioning system for an automotive vehicle an improved air routing arrangement and appropriate damper controls therefor.

In connection with the distribution of the air as it travels through the instrument panel openings, we contemplate using a pair of such openings one at each end of the instrument panel and each opening being provided with its own sets of louvers and covers therefor.

The louver arrangements in each instrument panel opening are such that the full force of the blower may be used for either defrosting or cooling, and, whereby, as in the case of cooling the interior of the automobile, the air may first be directed across the lap of the driver or passenger to effect a so-called pull down condition preparatory to directing the cooling air upwardly toward the top of the car for fully cooling the interior of the car.

We are aware of the various constructions heretofore used with respect to cooling the interior of an automotive vehicle and also for windshield defrosting. Under the circumstances it will be manifest that it is our chief aim to generally improve upon prior structures of the general type by providing an arrangement characterized by appreciable refinements and structural improvements.

The several objects, advantages and novel details of construction of the invention will be made more apparent as this description proceeds, especially when considered in connection with the accompanying drawings, wherein:

Figure 2 is a detail view of the louver arrangement including the covers.

Figure 1:
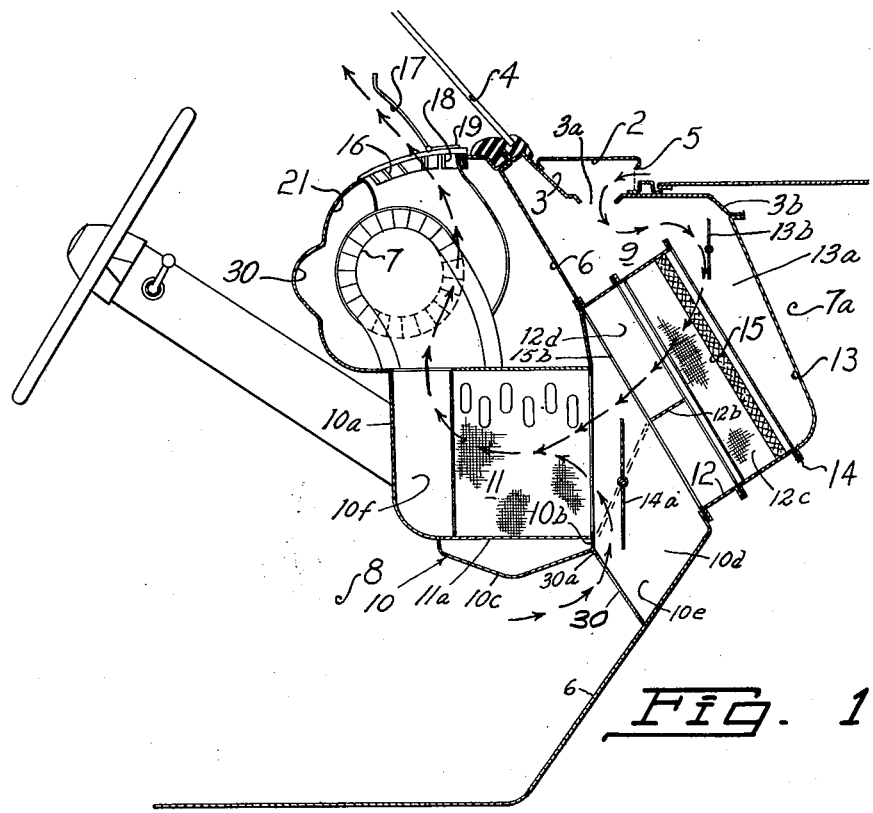
Figure 1 is a schematic view of the air conditioning system and a view of parts making up our invention arranged in their order of installation.
Figure 3:
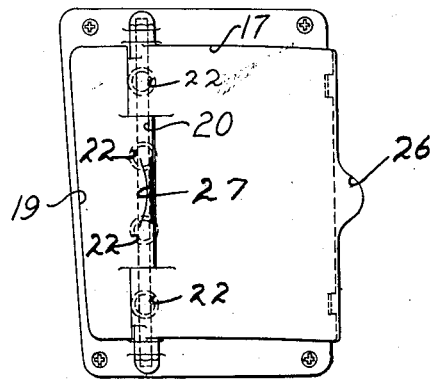
Figure 3 is a top plan view of the covers used over louvers for cooling and defrosting.

In general the air conditioning system is comprised of a heating unit and a cooling unit both of which are mounted at the "dash board" of the vehicle, the heating unit being utilized during the winter months and the cooling unit being utilized during the summer months.

The engine compartment 7a is separated from the passenger compartment 8 by means of a primary panel member 6 which normally spans the full width of the vehicle and is customarily referred to as the "dash board." A cowl 2 is secured to a cross ledge 3 which in turn is secured to the primary panel member 6. The cowl is mounted exteriorly of the passenger compartment immediately in front of windshield 4 and has an opening 5 for permitting entry of atmospheric air into the air conditioning system. The cross ledge 3 has an opening 3a therein.

A heat radiating core identified by the numeral 15a is mounted within a housing structure 12a and an air filter 15 is positioned above the heat radiating unit. The housing structure may include a separate section 12 secured to the section 12a and a baffle 12b serves to separate the housing section 12 into separate passages 12c and 12d. The forward portion 3b of the cross ledge has a marginal flange to which the cover 13 is removably secured. The lower edge of the cover is secured to the marginal flange 14 formed on the housing section 12a. The cover is spaced from the filter 15 thereby providing a passage 13a, the mouth of which is controlled by a suitable damper 13b. The damper, when opened as shown in Figure 1, permits atmospheric air to enter opening 5, then travel through opening 3a and on through passage 13a, filter 15, heat radiating core 15a and then on through the large opening 15b in the primary panel member 6.

Within the passenger compartment a housing structure, indicated generally by the numeral 10, may include a front wall 10a, a rear wall 10b and a floor portion 10c. The evaporator unit 11 may be supported on a suitable ledge 11a within the housing 10 and the forward wall of said evaporator unit is spaced from the front wall 10a of the housing thereby providing an air transfer passage identified by the numeral 10f leading to the blower 7.

A panel 30a extends from the primary panel member 6 to the underside of the housing 10 and in conjunction with the end walls 10d (only one of which is shown in Figure 1) provides an air reception chamber identified by the numeral 10e between the housing wall 10b and the primary panel 6. The panel 30a has an opening 30 therein which in one instance serves as an air discharge opening and in another instance as an air inlet opening, depending upon the position of the damper 14a. Such damper is shown in open position in Figure 1, the closed position being indicated in dotted lines. When in closed position, the upper marginal edge is generally aligned with the lower edge of the baffle 12b and the lower edge of the damper swings over against the housing wall 10.

The louvers 16 are arranged within an enlarged opening near the top of the instrument panel 21 and immediately above the blower 7. The louvers 18 are arranged forwardly of louvers 16 and adjacent the windshield 4. These louvers are formed in and are a part of a frame member 40 which may be secured to the instrument panel 21 by suitable fastening elements 41.

The hinged cover 17 is of an area sufficient to wholly encompass the louvers 16 and may be used to shut off air passage or to direct the passage of air from the louvers 16. A second hinged cover 19 of an area sufficient to wholly encompass the louvers 18 may be used to shut off heated air to defrost the windshield. Adjacent ends of each cover are hingedly mounted on a common hinge pin 20 which is secured in spaced supports 41 on the frame member 40.

Spaced longitudinally across the instrument panel and immediately below the hinge pin 20 are a series of spring retainers 22 which are open at the top to receive a coil spring 23 in each instance. These retainers depend downwardly from the frame member 40 and are integral therewith. Each spring in turn is covered by a cap 24 which may reciprocate within the retainer 22 and bears up against a flat surface 25 formed on that part of the covers 17 and 19 which are hingedly engaged with pin 20. Cover 17 is provided with a finger lift 26 and cover 19 with a finger lift 27 to make the manual raising and lowering of the covers easier. The pressure of the springs against the flats of the covers is sufficient to keep the covers in any position desired.

The operation of the air conditioning system is generally as follows. The damper 13b, when closed, negates the operation of the system and no atmospheric air can enter into the passenger compartment. Consequently, the blower would be idle and neither the heating feature nor the cooling feature of the system would be in operation.

Assuming that wintry weather prevails, then the heating feature is employed and the damper 13b is rotated to open position as shown in Figure 1. The heat radiating core 15a is activated (in a conventional manner not herein disclosed) and atmospheric air enters opening 5, then travels through opening 3a past the damper 13b and through the filter 15, heat radiating core 15a, passages 12c and 12d, a portion of such air then being discharged through opening 30 and the portion which travels through passage 12d continuing through the inactive cooling unit 11, into passage 10f, then through the blower 7 and out through the openings in the instrument panel which are controlled by the covers 17 and 19. The blower may be inactive and the forward movement of the vehicle sufficient to cause the ram air entering opening 5 to travel the routes just mentioned. If the blower is activated, then it is desirable to rotate damper 14a to the closed position as shown in dotted lines in Figure 1 whereupon a small portion of the air traveling through the heat radiating core will still be discharged into the passenger compartment through opening 30, however, the major portion of the heated air being drawn through passage 12d and on through the blower under the inducement thereof.

Assuming summer driving conditions and a desire to utilize the cooling feature of the system, the damper 13b is opened as shown in Figure 1 and the damper 14a is likewise opened to the position shown in solid lines in Figure 1. The evaporator unit 11 is activated (in a conventional manner not herein disclosed) for heat absorbing purposes and the heat radiating core 15a is deactivated. The blower 7 is activated and the incoming atmospheric air travels through opening 5, opening 3a, then through the deactivated heating core, on through passage 12d, then through evaporator unit 11 into passage 10f and on through the blower from whence it is discharged through the instrument panel openings controlled by covers 17. With the damper 14a in open position, the suction created by the blower causes the air within the passenger compartment to be drawn through opening 30 into compartment 10e and then on through the evaporator unit where it is mixed with the atmospheric air coming through passage 12d. The arrows shown in Figure 1 indicate the paths of travel of the atmospheric air and the recirculation air when using the cooling feature of the system. With the damper 14a opened, the recirculation air route to the evaporator unit is opened and opening 30 then serves as an air inlet opening instead of an air discharge opening.

Under ordinary operating conditions, we contemplate utilizing a pair of spaced enlarged openings in said instrument panel, one in front of the driver's seat and the other in front of a passenger seat. When the automobile is used after sitting in a hot sun, normally, the temperature is high in the interior. It is necessary for a certain period of time to elapse when the interior is cooled to afford relief to the occupants. We therefore contemplate raising the covers to the position designated by the letters LP. In this position, a stream of air is projected over the laps of the front seat occupants creating substantially immediate relief. As soon as the temperature lowers, the covers may be raised to the position indicated by the letter N wherein the cooling air resulting from passage through the cooled evaporator coils is directed to the roof of the vehicle and projects air over the entire vehicle affording relief to all occupants.

It is evident that various modifications, substitutions, eliminations, and additions may be resorted to without departing from the broad spirit and scope of our invention, and hence, we do not desire or intend to limit the invention in all respects to the exact disclosures of the specific example herein presented except as may be required by specific intended limitations thereto in certain of the claims hereto appended.

Having thus described our invention, what we claim is:

1. For use with an automotive vehicle having a passenger compartment and an engine compartment separated by a primary panel member, an instrument panel projecting from the primary panel into the passenger compartment and a windshield projecting upwardly from the instrument panel, an air conditioning apparatus including: means for directing a stream of conditioned air to the instrument panel from the underside thereof and additional means for selectively directing said stream of air onto the windshield or away from the windshield, said last means comprising, an open frame mounted in an opening in the instrument panel; a set of louvers in the forward portion of the frame for directing air away from the windshield; an additional set of louvers in the rearward portion of the frame for directing air onto the windshield; a cover for each set of louvers to selectively close off one set while exposing the other set.

2. Apparatus as set forth in claim 1 wherein the covers are separably movable and rotation of one cover in opening direction effects a closing of the other cover.

3. Apparatus as set forth in claim 2, wherein the covers are mounted on a common pintle and wherein means are provided for impeding rotation of the covers to assure that the covers will remain in adjusted position pending further adjustment.

4. Air conditioning apparatus for an automotive vehicle having a passenger compartment and an engine compartment comprising: a primary panel separating the engine compartment from the passenger compartment and having an opening therein; a first housing mounted at the panel opening on the engine compartment side thereof; a heat radiating device positioned within the housing; said housing having an opening to establish communication between the interior of the housing and atmosphere; a second housing mounted at the panel on the passenger compartment side thereof; a cooling device mounted within said second housing; said cooling unit having its rear wall spaced from the primary panel member to provide an air reception chamber between the heat radiating device and the cooling unit and exposed to the panel opening; a damper mounted within the air reception chamber; said chamber having an opening in communication with the passenger compartment, said damper when moved to closed position closing off direct communication between the rear wall of the cooling unit and the chamber opening.

5. Air conditioning apparatus for an automotive vehicle having a passenger compartment and an engine compartment comprising: a primary panel separating the engine compartment from the passenger compartment and having an opening therein; a first housing mounted at the panel opening on the engine compartment side thereof; a heat radiating device positioned within the housing; said housing having an opening to establish communication between the interior of the housing and atmosphere; said housing including a dual air passage beneath the heat radiating device and communicating with the panel opening; a second housing mounted at the panel on the passenger compartment side thereof; a cooling device mounted within said second housing; said cooling unit having its rear wall spaced from the primary panel member to provide an air reception chamber between the heat radiating device and the cooling unit and exposed to the panel opening; a damper mounted within the air reception chamber; said chamber having an opening in communication with the passenger compartment, said damper when moved to closed position closing off direct communication between the rear wall of the cooling unit and the chamber opening and also closing off direct communication between the chamber opening and one section of the dual passage.

References Cited in the file of this patent
UNITED STATES PATENTS

| | | |
|---|---|---|
| 2,037,367 | Chapman | Apr. 14, 1936 |
| 2,039,403 | Gillette | May 5, 1936 |
| 2,045,826 | Benolken | June 30, 1936 |
| 2,145,731 | Crowley | Apr. 18, 1939 |
| 2,304,642 | Hans | Dec. 8, 1942 |